United States Patent
Dorety (10) Patent No.: US 9,646,584 B1
(45) Date of Patent: May 9, 2017

(54) VISUAL AID FOR IMPROVISED MUSIC

(71) Applicant: Chris Dorety, Hopewell, NJ (US)

(72) Inventor: Chris Dorety, Hopewell, NJ (US)

( * ) Notice: Subject to any disclaimer, the term of this patent is extended or adjusted under 35 U.S.C. 154(b) by 0 days.

(21) Appl. No.: 15/378,111

(22) Filed: Dec. 14, 2016

Related U.S. Application Data (60) Provisional application No. 62/267,471, filed on Dec. 15, 2015.

(51) Int. Cl.
| | | |
|---|---|---|
| *G10H 1/02* | (2006.01) | |
| *G10G 1/02* | (2006.01) | |
| *G10G 7/00* | (2006.01) | |
| *G09B 15/02* | (2006.01) | |

(52) U.S. Cl.
CPC ............ *G10G 1/02* (2013.01); *G09B 15/026* (2013.01); *G10G 7/00* (2013.01)

(58) Field of Classification Search
CPC ...................................................... G10G 1/02
USPC ........ 84/471 R, 164, 484, 477 R, 478, 483.2
See application file for complete search history.

(56) References Cited

U.S. PATENT DOCUMENTS

| | | | | |
|---|---|---|---|---|
| 1,844,976 A | * | 2/1932 | Rantz ...................... | G10G 1/02 84/478 |
| 2,001,191 A | * | 5/1935 | Golden .................... | G10G 1/02 84/485 R |
| 2,204,641 A | * | 6/1940 | Wright .................. | G09B 15/026 84/471 R |
| 2,298,081 A | * | 10/1942 | Cohen ...................... | B41M 3/04 273/148 A |
| 2,385,093 A | * | 9/1945 | Marsh ..................... | G09B 15/02 281/21.1 |
| 2,542,235 A | | 2/1951 | Clopton | |
| 2,718,169 A | * | 9/1955 | Barnes .................... | G09B 15/02 84/480 |
| 2,864,275 A | * | 12/1958 | Fraleigh ................. | G09B 15/02 40/621 |
| 3,155,000 A | * | 11/1964 | Gnatt ....................... | G10G 1/02 84/478 |
| 3,196,732 A | * | 7/1965 | Conner ..................... | G10G 1/00 84/478 |
| 3,530,758 A | * | 9/1970 | Stillo ...................... | G09B 15/00 84/471 R |
| 3,592,098 A | * | 7/1971 | Zadig ..................... | G09B 5/062 340/384.7 |
| 3,715,951 A | * | 2/1973 | Lanaro ..................... | G10G 1/00 84/470 R |
| 3,728,931 A | * | 4/1973 | Leonard ............... | G09B 15/006 84/471 R |
| 3,748,947 A | | 7/1973 | Freiheit | |
| 3,791,254 A | | 2/1974 | Muller | |
| 3,906,831 A | * | 9/1975 | Leonard .................. | G10G 1/00 84/471 R |
| 4,350,070 A | * | 9/1982 | Bahu ....................... | G09B 15/04 345/169 |

(Continued)

*Primary Examiner* — David Warren
(74) *Attorney, Agent, or Firm* — Robert C. Montgomery; Montgomery Patent & Design, LP.

(57) ABSTRACT

A visual aid for music performers provides a mat-like structure having printed portions including a keyboard section, a tempo section, a music mode section, and a timing section. In use, a musician positions illuminated pucks using his/her foot upon the visual aid to communicate musical key changes, tempo changes, music mode changes, and/or timing changes. The visual aid enables musicians to improvise a musical number without interruption.

20 Claims, 4 Drawing Sheets

(56) References Cited

U.S. PATENT DOCUMENTS

| | | | | |
|---|---|---|---|---|
| 4,434,698 A | * | 3/1984 | Oberlander | G10G 1/04 84/483.2 |
| 4,706,536 A | * | 11/1987 | Sanders | G10H 1/34 200/5 A |
| 4,960,029 A | | 10/1990 | Nelson | |
| 4,990,092 A | * | 2/1991 | Cummings | G09B 5/062 40/455 |
| 5,153,829 A | * | 10/1992 | Furuya | G09B 15/002 379/110.01 |
| 5,209,665 A | * | 5/1993 | Billings | G10H 1/344 200/5 A |
| 5,254,008 A | * | 10/1993 | Dawson | G09B 15/08 434/227 |
| 5,440,071 A | | 8/1995 | Johnson | |
| 5,484,292 A | * | 1/1996 | McTaggart | B42C 9/00 345/901 |
| 5,546,843 A | * | 8/1996 | Degaard | G09B 15/08 84/478 |
| 5,709,552 A | | 1/1998 | LeGrange | |
| 5,772,208 A | * | 6/1998 | McTaggart | A63F 3/00643 273/237 |
| 5,803,748 A | * | 9/1998 | Maddrell | G09B 5/062 345/901 |
| 5,810,604 A | * | 9/1998 | Kopp, Jr. | G09B 5/062 200/5 A |
| 5,851,119 A | * | 12/1998 | Sharpe, III | G09B 11/00 434/169 |
| 6,051,769 A | * | 4/2000 | Brown, Jr. | G09B 15/023 84/470 R |
| 6,239,344 B1 | * | 5/2001 | Prevost | G09B 15/006 84/471 R |
| 6,259,006 B1 | * | 7/2001 | Parienti | G10H 1/32 84/171 |
| 6,331,668 B1 | | 12/2001 | Michero | |
| 6,763,995 B1 | * | 7/2004 | Song | G06F 3/0224 235/375 |
| 6,967,274 B2 | * | 11/2005 | Hanington | G09B 15/02 84/470 R |
| 7,253,349 B1 | * | 8/2007 | Saltsman | G10C 3/12 84/423 R |
| 7,485,794 B2 | * | 2/2009 | Koizumi | G10H 1/0083 84/477 R |
| 8,207,458 B2 | * | 6/2012 | Chen | B42D 3/123 200/43.04 |
| 9,111,516 B1 | * | 8/2015 | Saraceni | G10H 1/34 |
| 2009/0188378 A1 | * | 7/2009 | Folkesson | G10H 1/34 84/615 |
| 2010/0005952 A1 | * | 1/2010 | LaMon | G09B 15/08 84/478 |
| 2013/0186260 A1 | | 7/2013 | Velho et al. | |
| 2016/0217702 A1 | * | 7/2016 | Caldwell-Edmonds | G10G 1/02 |

* cited by examiner

VISUAL AID FOR IMPROVISED MUSIC

RELATED APPLICATIONS

The present invention is a continuation-in-part of and claims the benefit of U.S. Provisional Application No. 62/267,471 filed on Dec. 15, 2015, the entire disclosures of which are incorporated herein by reference.

FIELD OF THE INVENTION

The present invention relates generally to a visual aid suited for communicating key and tempo changes to a plurality musicians during a performance.

BACKGROUND OF THE INVENTION

During performances of music, there is a group of musicians each playing different instruments together to provide a song. Often, the songs that are performed are done so many times throughout the life of the group of musicians playing together. It is common or desirable to alter or change the structure of the song, sometimes morphing into a different song altogether during the performance. Many jazz compositions leave room during the performance to allow an individual performer to perform solo.

Occasionally, multiple performers can go "off-script" as well. Although these types of performances lack a specific structure and enable individualism to shine through, some sort of conformity or indication is preferable during the performance. If one (1) individual is playing off tempo or in another key to provide a dissonant and unattractive sound, it could distract from the performance. Thus, there is a need to provide a way to indicate tempo and upcoming key changes, amongst other musical styles, during a musical performance.

SUMMARY OF THE INVENTION

The inventor has recognized the aforementioned inherent problems and lack in the art and observed that there is a need for a visual aid configured for use during an improvised musical performance, comprising a first base board, a second base board, a third base board and at least one (1) puck. The first base board has a first base board first edge, a first base board face, a first base board second edge and a first base board ramp. The first base board further comprises a first keyboard section which is located on the first base board face, a first tempo section which is located on the first base board face subjacent the keyboard section, a first mode section which is located on the first base board face subjacent the tempo section and a first film layer affixed upon and coextensive with the first base board face.

The second base board has a second base board first edge, a second base board face, a second base board second edge and a second base board ramp. The second base board further comprises a second keyboard section which is located on the second base board face, a first tempo section which is located on the second base board face subjacent the keyboard section, a second mode section which is located on the second base board face subjacent the tempo section and a second film layer affixed upon and coextensive with the second base board face.

The third base board has a third base board first edge, a third base board face, a third base board second edge and a third base board ramp. The third base board further comprises a third keyboard section which is located on the third base board face, a first tempo section which is located on the third base board face subjacent the keyboard section, a third mode section which is located on the third base board face subjacent the tempo section and a third film layer affixed upon and coextensive with the third base board face.

The first keyboard section, second keyboard section and the third keyboard section are contiguously disposed across the first base board, the second base board and the third base board. The first tempo section, second tempo section and the third tempo section are contiguously disposed across the first base board, the second base board and the third base board. The first mode section, second mode section and the third mode section are contiguously disposed across the first base board, the second base board and the third base board.

The puck is capable of being slidingly positioned upon the visual aid by use of the first base board ramp, the second base board ramp or the third base board ramp. Each puck is freely moveable about a surface of the first film layer, the second film layer or the third film layer with a resting place of each the puck being communicative of a musical element. The first base board is hingedly secured to the second base board along the first base board second edge and second base board first edge while the second base board is hingedly secured to the third base board along the second base board second edge and third base board first edge.

In an alternate embodiment, the first film layer, second film layer and third film layer comprise a respective first fastening exterior, second fastening exterior and third fastening exterior. Furthermore, each puck has fastener on a bottom surface. With this embodiment, each puck is capable of being removably fastened to a resting place on either the first film layer, second film layer or third film layer. As with the preferred embodiment, the resting place of each puck communicates a musical element.

The keyboard section may comprise a plurality of white piano key indicia and a plurality of black piano key indicia. The plurality of white piano key indicia may comprise respective notes of a piano keyboard indicated by either A, B, C, D, E, F or G and/or a major and minor key indicium. The plurality of black piano key indicia may also comprise respective notes of a piano keyboard indicated by either D-Flat/C-Sharp, E-Flat/D-Sharp, G-Flat/F-Sharp, A-Flat/G-Sharp or B-Flat/A-Sharp.

At least one (1) tempo section may comprise a plurality of lines parallel to the white piano key indicia indicative of half time, a center line or double time, a letter H indicative of a half tempo, a letter S indicative of a slow tempo, a letter F indicative of a fast tempo or a letter D indicative of a double tempo. At least one (1) mode section may comprise a timing segment having a plurality of timing indicia and a plurality of mode indicia. The timing indicia may comprise symbols indicative of simple, compound, complex, mixed, additive, or irrational meters. The plurality of mode indicia may comprise a rectangular box containing a word being either Ionian, Dorian, Phrygian, Lydian, Mixolydian, Aeolian or Locrian.

Each puck may also comprise a puck housing having a translucent face, a power source removably secured within the puck housing, a circuit board secured within the puck housing and in electrical communication with the power source, a plurality of lights disposed within the puck housing subjacent the translucent face and in electrical communication with the circuit board and a power switch disposed upon a side surface of the puck housing in electrical communication with the circuit board. Activation of the power switch illuminates the plurality of lights while deactivation of the power switch ceases illumination of the plurality of lights.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 visual aid
20 keyboard section
22 first film layer
24 second film layer
26 third film layer
27 hinge
28 white key
30 white key indicia
35 major/minor indicia
40 black key
42 black key indicia
50 tempo section
54 tempo indicia
55 tempo numerical value
56a half-time line
56b double-time line
56c center line
60a first puck
60b second puck
60c third puck
60d fourth puck
61 puck housing
62 power switch
63a lamp
63b illumination
64 circuit board
65 battery
66 battery holder
67 battery compartment opening
68 battery compartment lid
69 wiring
70 mode section
72 mode segment
74 mode indicia
76 timing segment
78 timing indicia
80a first base board
80b second base board
80c third base board
90 first base board first edge
95 first base board face
100 first base board second edge
105 second base board first edge
110 second base board face
115 second base board second edge
120 third base board first edge
125 third base board face
130 third base board second edge
135 first ramp
136 second ramp
137 third ramp

DETAILED DESCRIPTION OF THE PREFERRED EMBODIMENT

The best mode for carrying out the invention is presented in terms of its preferred embodiment, herein depicted within FIGS. 1 through 4b. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a visual aid for improvised music (herein described as the "device") 10, which provides a three-section base board 80a, 80b, 80c each having an integrally molded, etched, or carved, keyboard section 20, tempo section 50, and music mode section 70. Each section 20, 50 and mode section 70 likewise display a plurality of integrally molded, etched, or carved, musical indicia which will be discussed in detail below. Each section 20, 50 and mode section 70 together with their corresponding plurality of indicia act to visually communicate to a plurality of musicians, occurrences of musical key changes, tempo changes, timing changes, and/or a music mode changes as indicated by a repositioning of corresponding movable pucks 60a, 60b, 60c, 60d which lay upon and are particularly positioned upon the sections 20, 50, 70. While playing a musical instrument, a musician may manipulate the pucks 60a, 60b, 60c, 60d using his/her foot while improvising or performing a musical number in an uninterrupted manner.

Figure 1:
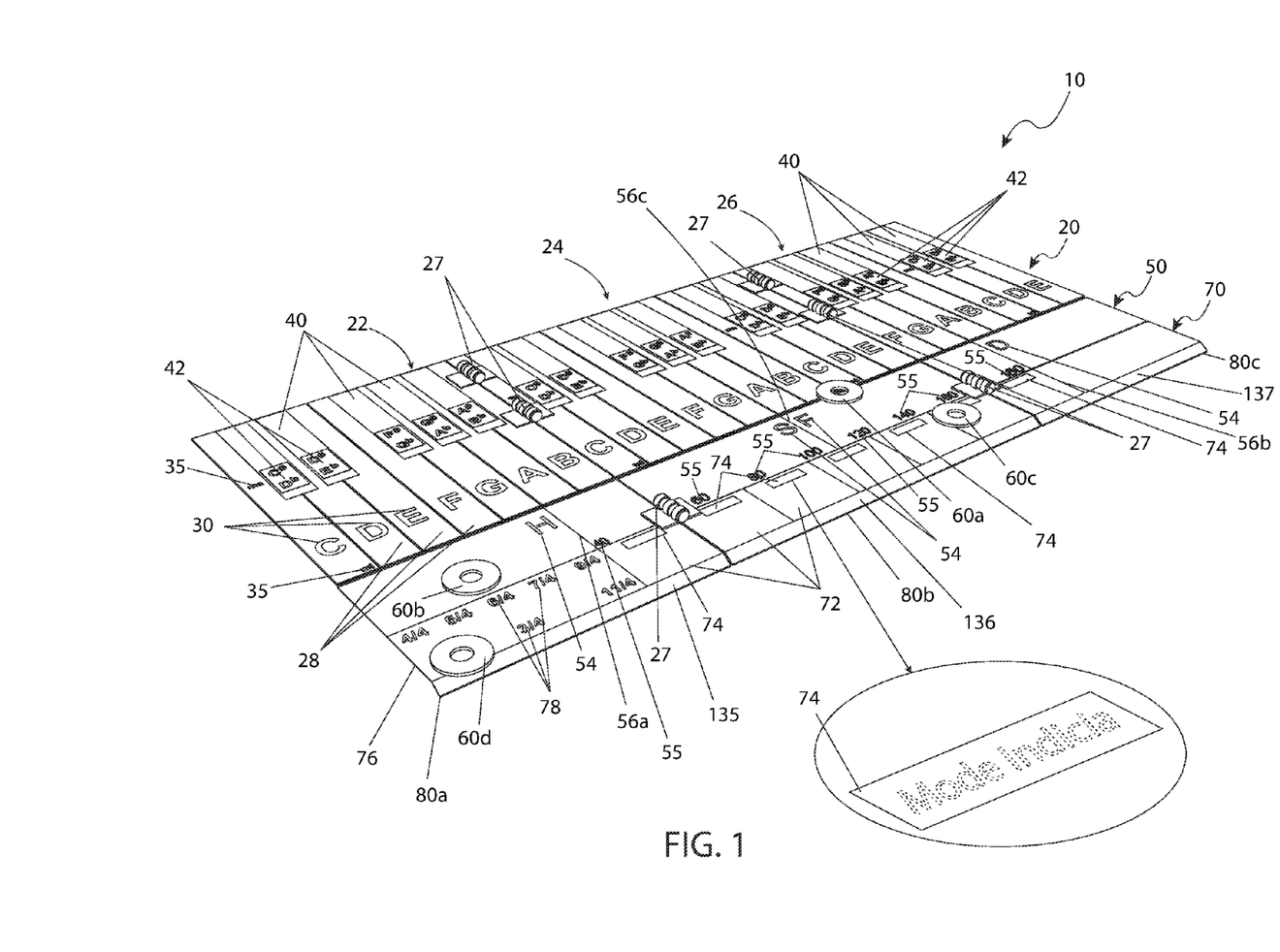
FIG. 1 is a perspective view of a visual aid for improvised music 10, according to a preferred embodiment of the present invention.
Figure 2:
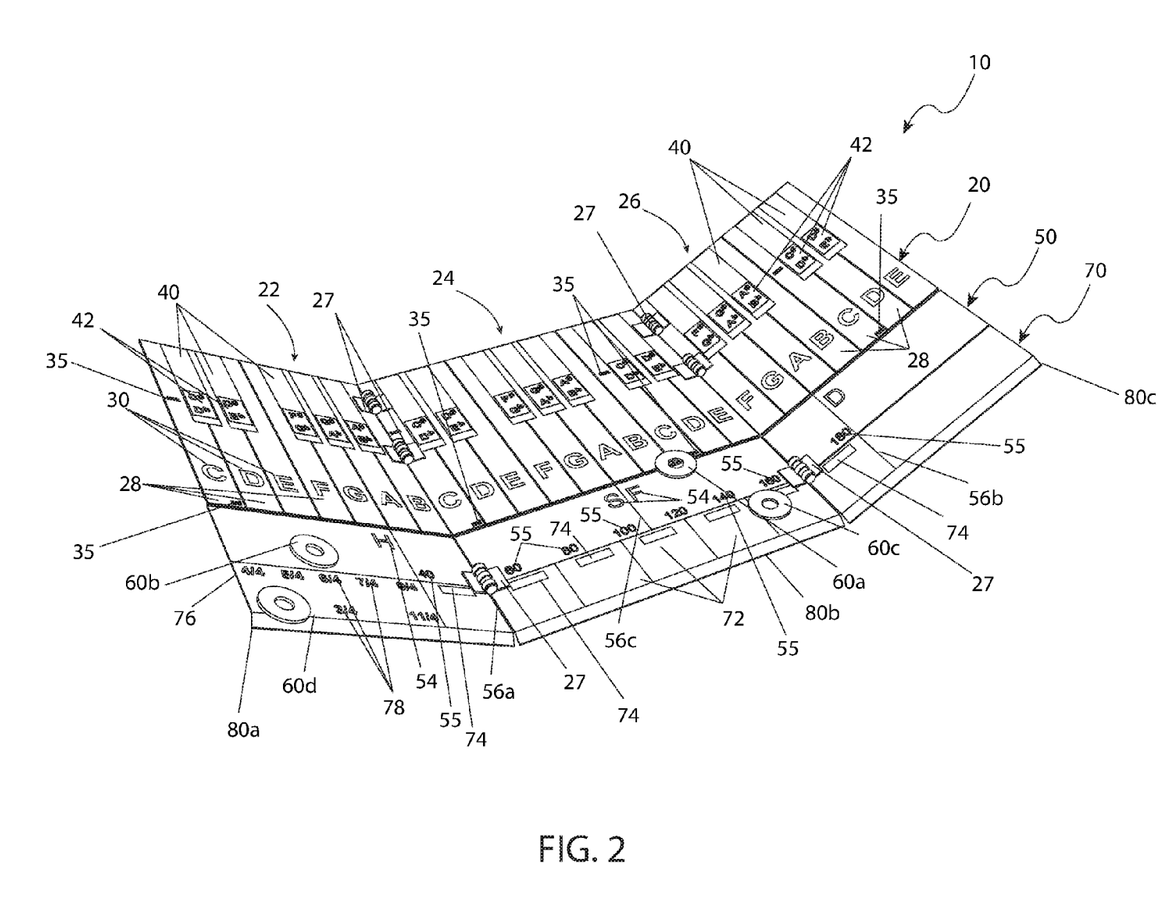
FIG. 2 is another perspective view of the visual aid 10 depicting a partially folded state, according to a preferred embodiment of the present invention.

Referring now to FIGS. 1 and 2, perspective views of the device 10 depicting flat and partially folded states, according to the preferred embodiment of the present invention, are disclosed. An embodiment of the device 10 is illustrated here being configured in three (3) hingedly connected boards 80a, 80b, 80c each having sections 20, 50, 70. Section 20 displays, but is not limited to: a plurality of white and black piano keys 28, 40 with a corresponding plurality of note indicators 30, 42 and a corresponding plurality of major/minor indicia 35. Section 50 displays but is not limited: to a plurality of tempo indicia 54. Section 70 displays, but is not limited to: a plurality of mode segment indicia 72 each having a music mode change indicia 74. Base board 80a further displays a half-time line indicia 56a perpendicularly disposed across the tempo section 50 and music mode section 70. Base board 80b further displays a center line indicia 56c perpendicularly disposed across the tempo section 50. Base board section 80c further displays a double-time line indicia 56b, perpendicularly disposed across the tempo section 50. At least one (1) section 20, 50, 70 also has a timing segment 76 having a plurality of timing indicia 78.

Each base board 80a, 80b, 80c also comprise a corresponding first film layer 22, a second film layer 24, and a third film layer 26. The film layers 22, 24, 26 are adhesively, or otherwise affixed to respective first base board 80a, second base board 80b, and third base board 80c portions (also see FIG. 3) thereby covering the plurality of indicia discussed above. The film layers 22, 24, 26 are envisioned to be made using extruded semi-rigid plastic sheet material such as SINTRA®, polyethylene, or an equivalent durable washable material, and be approximately three millimeters (3 mm) in thickness. The film layers 22, 24, 26 are envisioned to be adhesively affixed to the subjacent base boards 80a, 80b, 80c which are in turn envisioned to be made using a structurally rigid and planar polymer material such as polypropylene (PP), Acrylonitrile butadiene styrene (ABS), or equivalent material, and being approximately one-quarter of an inch (¼ in.) in thickness.

The device 10 provides a means for compact storage via a plurality of hinges 27 which connect adjacent vertical edge portions of the film layers 22, 24, 26 and base board 80a, 80b, 80c portions (see FIG. 3) through each film layer 22, 24, 26. The dimensions of the device 10 when in a deployed flat state is approximately forty-two inches (42 in.) in width by eleven inches (11 in.) in height. Each base board 80a, 80b, 80c has a ramp 135, 136, 137 each respectively located at a bottom edge of each base board 80a, 80b, 80c. Each ramp 135, 136, 137 facilitates the sliding of a puck 60a, 60b, 60c or 60d from a position exterior to the device 10 to a position upon the surface of the device 10.

When unfolded, the device 10 provides a lateral keyboard section 20 across a top edge, being a flat surface which includes a combination of integrally molded, etched, or carved white keys 28 and black keys 40 so as to emulate a conventional piano keyboard. The keys 28, 40 are indicated by white key indicia 30 and black key indicia 42 being integrally molded, etched, or carved upon the base boards 80a, 80b, 80c. The white key indicia 30 and black key indicia 42 portions of the key portions 28, 40 indicate individual musical notes starting with a "C" and progressing from left to right to indicate three (3) octaves, covering the entire surface of the keyboard section 20. Each white key 28 includes integrally molded, etched, or carved white key indicia 30 being located on a lower portion of the white key 28. Each black key 40 includes integrally molded, etched, or carved black key indicia 42 within a white rectangle portion of each black key 40, also including sharp note and flat note characters. A musician may make a key change by repositioning a first puck 60a upon a desired key 30, 42. Major/minor key indicia 35 is also located on the white keys 28, preferably on the "C" white key 28. The major key 35 is indicated as "ma" and is located near the middle adjacent the black key 40 and the minor key 35 is indicated as "mi" and is located adjacent the bottom of the white key 28. These keys 35 are there to indicate the chord at which the particular passage is to be played.

The tempo section 50 is parallel to, and below the keyboard section 20 and is envisioned to be approximately four inches (4 in.) in height. The tempo section 50 provides integrally molded, etched, or carved tempo indicia 54, envisioned to include symbols and characters such as, but limited to: a half-time line 56a, a double-time line 56b, a center line 56c, as well as letters such as an "S" indicating slow tempo, an "H" indicating half time tempo (cut time), an "F" indicating a fast tempo, and a "D" indicating double time. The lines 56a, 56b, 56c act to divide the tempo section 50 into four (4) sections which in turn contain the aforementioned letter indicia 54. A musician may make a tempo change by repositioning a second puck 60b upon desired tempo indicia 54. It is envisioned that other indicia pertaining to tempo such as numerical values 55 such as "40", "60", "80", "100", "120", "140", "160" and "180", and the like, may also be utilized with equal benefit, and as such should not be interpreted as a limiting factor of the device 10.

In a similar manner the mode section 70 includes a plurality of integrally molded, etched, or carved rectangular mode segments 72, each displaying different mode indicia 74 representing various musical mode types such as, but not limited to: Ionian, Dorian, Phrygian, Lydian, Mixolydian, Aeolian, Locrian, and the like (please see FIG. 1 Expanded Region 74). To initiate a mode change, a musician repositions a third puck 60c upon a desired mode segment 72. Additionally, the mode section 70 includes a timing segment 76 having respective timing indicia 78 such as, but not limited to: simple time (such as 2/4 or 3/4), compound time (e.g., 6/8, 12/8, and 9/4), complex time (e.g., 5/4 or 7/8), mixed time (e.g., 5/8|3/2|6/8|2/4|), additive time (e.g., 2+3, 2+3+2), and irrational time (e.g., 3/10 or 5/24). In a similar manner, a musician may make a musical timing change by repositioning a fourth puck 60d upon a desired timing indicia 78.

The pucks 60a, 60b, 60c, 60d may be positioned upon respective keyboard section 20, tempo section 50, music mode section 70, and timing segment 76 portions. The position of the pucks 60a, 60b, 60c, 60d communicate a key, a tempo, a mode and a timing, and may be changed "on-the-fly" by the musicians. The pucks 60a, 60b, 60c, 60d are envisioned to be made of a similar material as the base boards 80a, 80b, 80c and have a circular disc-shape. The pucks 60a, 60b, 60c, 60d are to be positioned by at least one (1) musician, preferably using their foot, thereby allowing continuous playing of an instrument to initiate improvising during a musical session or performance (see FIGS. 4a and 4b).

The preferred method of utilizing the device 10 would be placed upon a floor surface; however, the device 10 may also be affixed to a wall surface for improved visibility using tape, adhesives, or various hardware, if desired. When mounted to a wall surface, the film layer 22, 24, 26 have a hook and loop fastener surface while the puck portions 60a, 60b, 60c, 60d likewise are envisioned to include hook-and-loop fasteners, or similar means, to a rear surface, allowing manipulation of the pucks 60a, 60b, 60c, 60d by hand upon the film layer 22, 24, 26.

Figure 3:
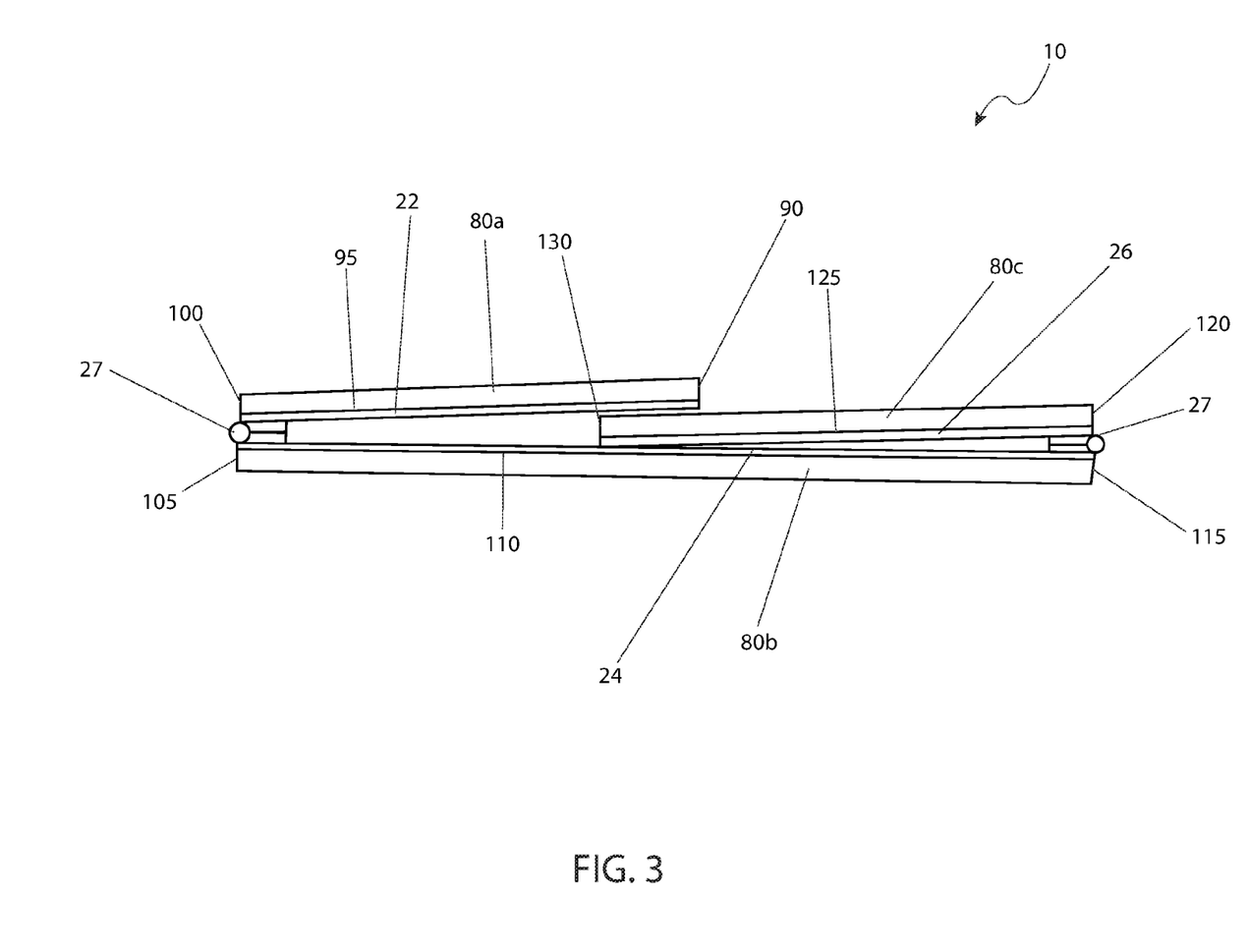
FIG. 3 is a side view of the visual aid 10 depicting a completely folded state, according to a preferred embodiment of the present invention.

Referring now to FIG. 3, a side view of the device 10 depicting a completely folded state having a first base board first edge 90, first base board first face 95, a first base board second edge 100, a second base board first edge 105, second base board first face 110, a second base board second edge 115, a third base board first edge 120, a third base board first face 125 and a third base board second edge 130, according to a preferred embodiment of the present invention, is disclosed. The device 10 provides a means for compact storage via a plurality of hinges 27 which connect the adjacent film layer 22, 24, 26 and base board 80a, 80b, 80c portions. The portions of the device 10 are joined along adjacent vertical edges via the axial hinges 27. The hinges are rigidly affixed to the sections of the device 10 using methods such as industrial adhesives, plastic welding, rivets, or the like. The hinges 27 enable the portions of the device 10 to fold upon each other to provide a compact form for easy storage.

Figure 4A:
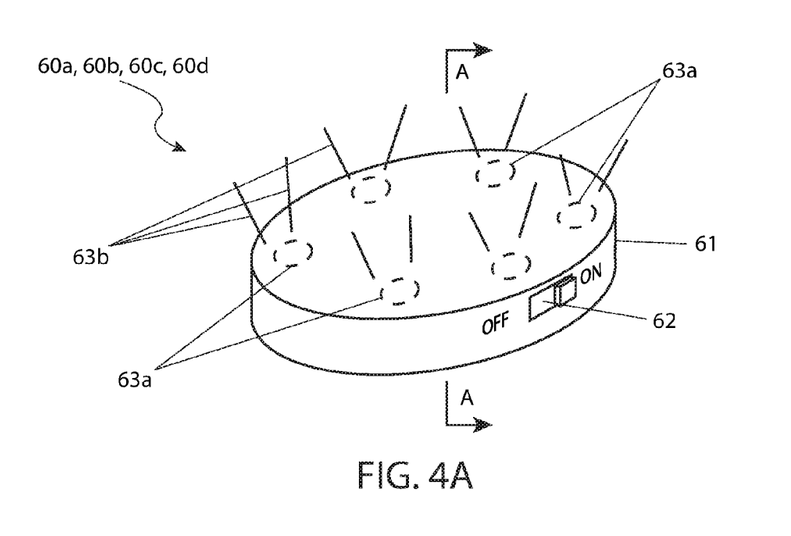
FIG. 4a is a perspective view of a puck portion 60a, 60b, 60c, 60d of the visual aid music 10, according to a preferred embodiment of the present invention; and, FIG. 4b is a sectional view of a puck 60a, 60b, 60c, 60d taken along section line A-A (see FIG. 4a), according to a preferred embodiment of the present invention.
Figure 4B:
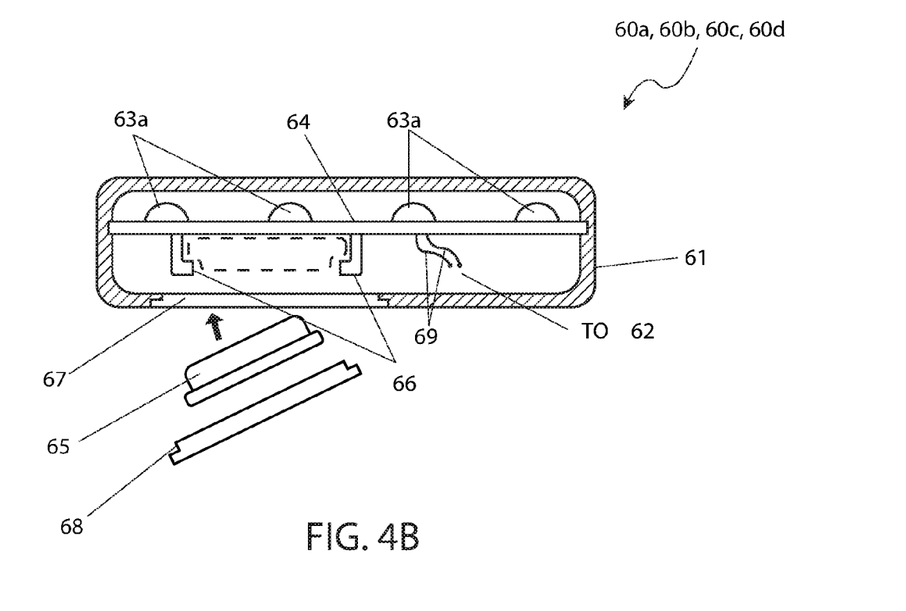

Referring now to FIGS. 4a and 4b, perspective and sectional views of a puck portion 60a, 60b, 60c, 60d of the device 10, according to a preferred embodiment of the present invention, are disclosed. Each puck 60a, 60b, 60c, 60d is to provide bright colored illumination 63b for ease of viewing. Each puck 60a, 60b, 60c, 60d includes a translucent circular disc-shape puck housing 61 containing a plurality of colored lamps 63a positioned subjacent to a top surface of the puck housing 61. The lamps 63a are preferably colored light emitting diodes (LED's), or an equivalent illuminating technology. Each puck 60a, 60b, 60c, 60d further includes internal electronic and electrical portions including a circuit board 64, the aforementioned lamps 63a, a miniature battery 65, and an externally accessible power switch 62. The circuit board 64 is in electrical communication with the aforementioned internal components via circuitry and/or wiring 69, and is powered by the battery 65. The battery 65 is envisioned to be a replaceable low-profile miniature direct current (DC) unit, being similar to those used in small electronic devices, watches, and the like. The position of the battery 65 is retained via a battery holder 66, envisioned to be integral to the circuit board 64. The battery 65 may be accessed by a user for installation or replacement via a battery compartment opening 67 and a removable battery compartment lid 68 located along a bottom surface of the puck housing 61.

It is envisioned that other styles and configurations of the present invention can be easily incorporated into the teachings of the present invention, and only one (1) particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 may be achieved by performing the following steps: procuring the device 10; placing the device 10 upon a floor surface or affixing the device 10 to a wall surface; being careful to position the device 10 so as to provide visual access to participating musicians; installing a fresh battery 65 into each puck 60a, 60b, 60c, 60d; activating the illumination 63b of each puck using the power switches 62; placing the pucks 60a, 60b, 60c, 60d upon the respective sections 20, 50, 70; beginning an improvised music session or normal performance; manipulating the first puck 60a along the keyboard section 20 using a foot portion of a user until the first puck 60a is positioned upon a respective white key 28 or black key 40 to indicate to the musicians an occurrence of a musical key change, or on the major or minor key 35 to indicate the chord; utilizing the tempo section 50 in like manner to indicate a tempo change by positioning the second puck 60b upon a selected tempo indicia 54; utilizing the mode section 70 in like manner to indicate a change in music mode by positioning the third 60c upon a selected mode segment 72; indicating a change in music timing by positioning the fourth puck 60d upon a desired timing indicia 78; continuing to indicate key, tempo, mode, and timing changes by repositioning the pucks 60a, 60b, 60c, 60d as needed during a music session; and, benefiting from improved communication of a key changes, tempo changes, mode changes, and timing changes without musical interruption, while improvising or performing a musical number, afforded a user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A visual aid configured for use during an improvised musical performance, comprising:
   a first base board having a first base board first edge, a first base board face, a first base board second edge and a first base board ramp comprising:
      a first keyboard section located on said first base board face;
      a first tempo section located on said first base board face subjacent said keyboard section;
      a first mode section located on said first base board face subjacent said tempo section; and,
      a first film layer affixed upon and coextensive with said first base board face;
   a second base board having a second base board first edge, a second base board face, a second base board second edge and a second base board ramp comprising:
      a second keyboard section located on said second base board face;
      a second tempo section located on said second base board face subjacent said keyboard section;
      a second mode section located on said second base board face subjacent said tempo section; and,
      a second film layer affixed upon and coextensive with said second base board face;
   a third base board having a third base board first edge, a third base board face, a third base board second edge and a third base board ramp comprising:
      a third keyboard section located on said third base board face;
      a third tempo section located on said third base board face subjacent said keyboard section;
      a third mode section located on said third base board face subjacent said tempo section; and,
      a third film layer affixed upon and coextensive with said third base board face;
      wherein said first keyboard section, second keyboard section and said third keyboard section are contiguously disposed across said first base board, said second base board and said third base board;
      wherein said first tempo section, second tempo section and said third tempo section are contiguously disposed across said first base board, said second base board and said third base board; and,
      wherein said first mode section, second mode section and said third mode section are contiguously disposed across said first base board, said second base board and said third base board; and,
   at least one puck;
   wherein each said puck is capable of being slidingly positioned upon said visual aid by use of said first base board ramp, said second base board ramp or said third base board ramp;

wherein each said puck is freely moveable about a surface of said first film layer, said second film layer or said third film layer with a resting place of each said puck being communicative of a musical element;

wherein said first base board is hingedly secured to said second base board along said first base board second edge and second base board first edge; and, wherein said second base board is hingedly secured to said third base board along said second base board second edge and third base board first edge.

2. The visual aid of claim 1, wherein said keyboard section comprises:
   a plurality of white piano key indicia; and,
   a plurality of black piano key indicia.

3. The visual aid of claim 2, wherein said plurality of white piano key indicia comprises respective notes of a piano keyboard indicated by either A, B, C, D, E, F or G.

4. The visual aid of claim 3, wherein said plurality of white piano key indicia further comprises a major key indicia and a minor key indicia.

5. The visual aid of claim 2, wherein said plurality of black piano key indicia comprises respective notes of a piano keyboard indicated by either D-Flat/C-Sharp, E-Flat/D-Sharp, G-Flat/F-Sharp, A-Flat/G-Sharp or B-Flat/A-Sharp.

6. The visual aid of claim 1, wherein at least one said tempo section comprises:
   a plurality of lines parallel to said white piano key indicia indicative of half time, a center line or double time;
   a letter H indicative of a half tempo;
   a letter S indicative of a slow tempo;
   a letter F indicative of a fast tempo; or,
   a letter D indicative of a double tempo.

7. The visual aid of claim 1, wherein at least one said mode section comprises:
   a timing segment having a plurality of timing indicia; and,
   a plurality of mode indicia.

8. The visual aid of claim 7, wherein said timing indicia comprises symbols indicative of simple, compound, complex, mixed, additive, or irrational meters.

9. The visual aid of claim 7, wherein said plurality of mode indicia comprise a rectangular box containing a word being either Ionian, Dorian, Phrygian, Lydian, Mixolydian, Aeolian or Locrian.

10. The visual aid of claim 1, wherein each puck comprises:
    a puck housing having a translucent face;
    a power source removably secured within said puck housing;
    a circuit board secured within said puck housing and in electrical communication with said power source;
    a plurality of lights disposed within said puck housing subjacent said translucent face and in electrical communication with said circuit board; and,
    a power switch disposed upon a side surface of said puck housing in electrical communication with said circuit board;
    wherein activation of said power switch illuminates said plurality of lights; and,
    wherein deactivation of said power switch ceases illumination of said plurality of lights.

11. A visual aid configured for use during an improvised musical performance, comprising:
    a first base board having a first base board first edge, a first base board face, a first base board second edge and a first base board ramp comprising:
    a first keyboard section located on said first base board face;
    a first tempo section located on said first base board face subjacent said keyboard section;
    a first mode section located on said first base board face subjacent said tempo section; and,
    a first film layer having a first fastening exterior affixed upon and coextensive with said first base board face;
    a second base board having a second base board first edge, a second base board face, a second base board second edge and a second base board ramp comprising:
    a second keyboard section located on said second base board face;
    a second tempo section located on said second base board face subjacent said keyboard section;
    a second mode section located on said second base board face subjacent said tempo section; and,
    a second film layer having a second fastening exterior affixed upon and coextensive with said second base board face;
    a third base board having a third base board first edge, a third base board face, a third base board second edge and a third base board ramp comprising:
    a third keyboard section located on said third base board face;
    a third tempo section located on said third base board face subjacent said keyboard section;
    a third mode section located on said third base board face subjacent said tempo section; and,
    a third film layer having a third fastening exterior affixed upon and coextensive with said third base board face;
    wherein said first keyboard section, second keyboard section and said third keyboard section and contiguously disposed across said first base board, said second base board and said third base board;
    wherein said first tempo section, second tempo section and said third tempo section and contiguously disposed across said first base board, said second base board and said third base board; and,
    wherein said first mode section, second mode section and said third mode section and contiguously disposed across said first base board, said second base board and said third base board; and,
    at least one puck, each having a puck fastener on a bottom surface thereof;
    wherein each said puck is capable of being removably fastened to a resting place on said first film layer, said second film layer or said third film layer, said resting place being communicative of a musical element;
    wherein said first base board is hingedly secured to said second base board along said first base board second edge and second base board first edge; and,
    wherein said second base board is hingedly secured to said third base board along said second base board second edge and third base board first edge.

12. The visual aid of claim 11, wherein said keyboard section comprises:
    a plurality of white piano key indicia; and,
    a plurality of black piano key indicia.

13. The visual aid of claim 12, wherein said plurality of white piano key indicia comprises respective notes of a piano keyboard indicated by either A, B, C, D, E, F or G.

14. The visual aid of claim 13, wherein said plurality of white piano key indicia further comprises a major key indicia and a minor key indicia.

15. The visual aid of claim 12, wherein said plurality of black piano key indicia comprises respective notes of a piano keyboard indicated by either D-Flat/C-Sharp, E-Flat/D-Sharp, G-Flat/F-Sharp, A-Flat/G-Sharp or B-Flat/A-Sharp.

16. The visual aid of claim 11, wherein at least one said tempo section comprises:
- a plurality of lines parallel to said white piano key indicia indicative of half time, a center line or double time;
- a letter H indicative of a half tempo;
- a letter S indicative of a slow tempo;
- a letter F indicative of a fast tempo; or,
- a letter D indicative of a double tempo.

17. The visual aid of claim 11, wherein at least one said mode section comprises:
- a timing segment having a plurality of timing indicia; and,
- a plurality of mode indicia.

18. The visual aid of claim 17, wherein said timing indicia comprises symbols indicative of simple, compound, complex, mixed, additive, or irrational meters.

19. The visual aid of claim 17, wherein said plurality of mode indicia comprise a rectangular box containing a word being either Ionian, Dorian, Phrygian, Lydian, Mixolydian, Aeolian or Locrian.

20. The visual aid of claim 11, wherein each puck comprises:
- a puck housing having a translucent face;
- a power source removably secured within said puck housing;
- a circuit board secured within said puck housing and in electrical communication with said power source;
- a plurality of lights disposed within said puck housing subjacent said translucent face and in electrical communication with said circuit board; and,
- a power switch disposed upon a side surface of said puck housing in electrical communication with said circuit board;
- wherein activation of said power switch illuminates said plurality of lights; and,
- wherein deactivation of said power switch ceases illumination of said plurality of lights.

* * * * *